Jan. 20, 1925.                                                 1,523,636
                            W. G. DUNN
                       AUTOMOBILE BODY FRAME
                       Filed Nov. 9, 1922        2 Sheets-Sheet 1
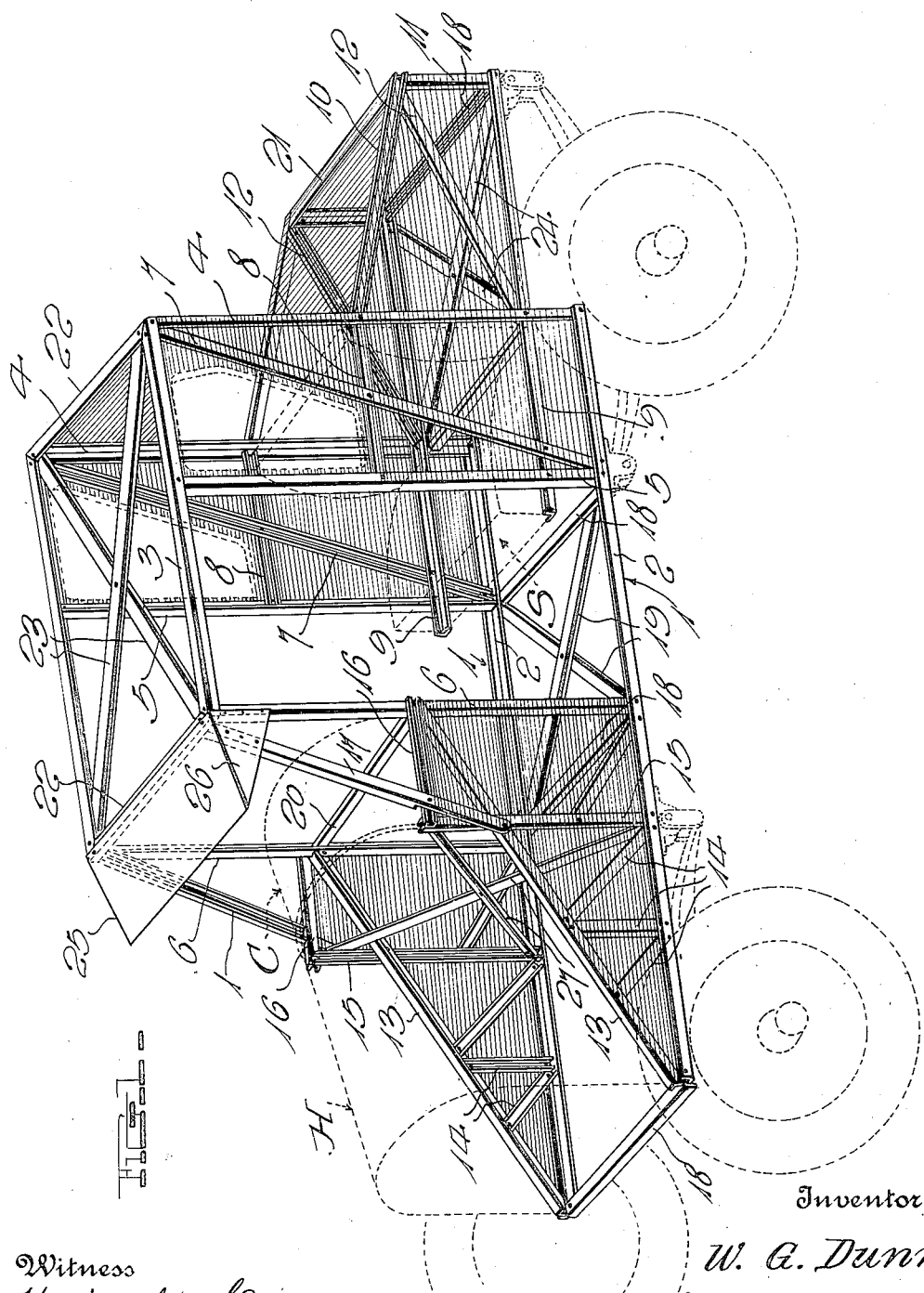
Witness
H. Woodard
Inventor
W. G. Dunn
By H. B. Willson &co
Attorneys

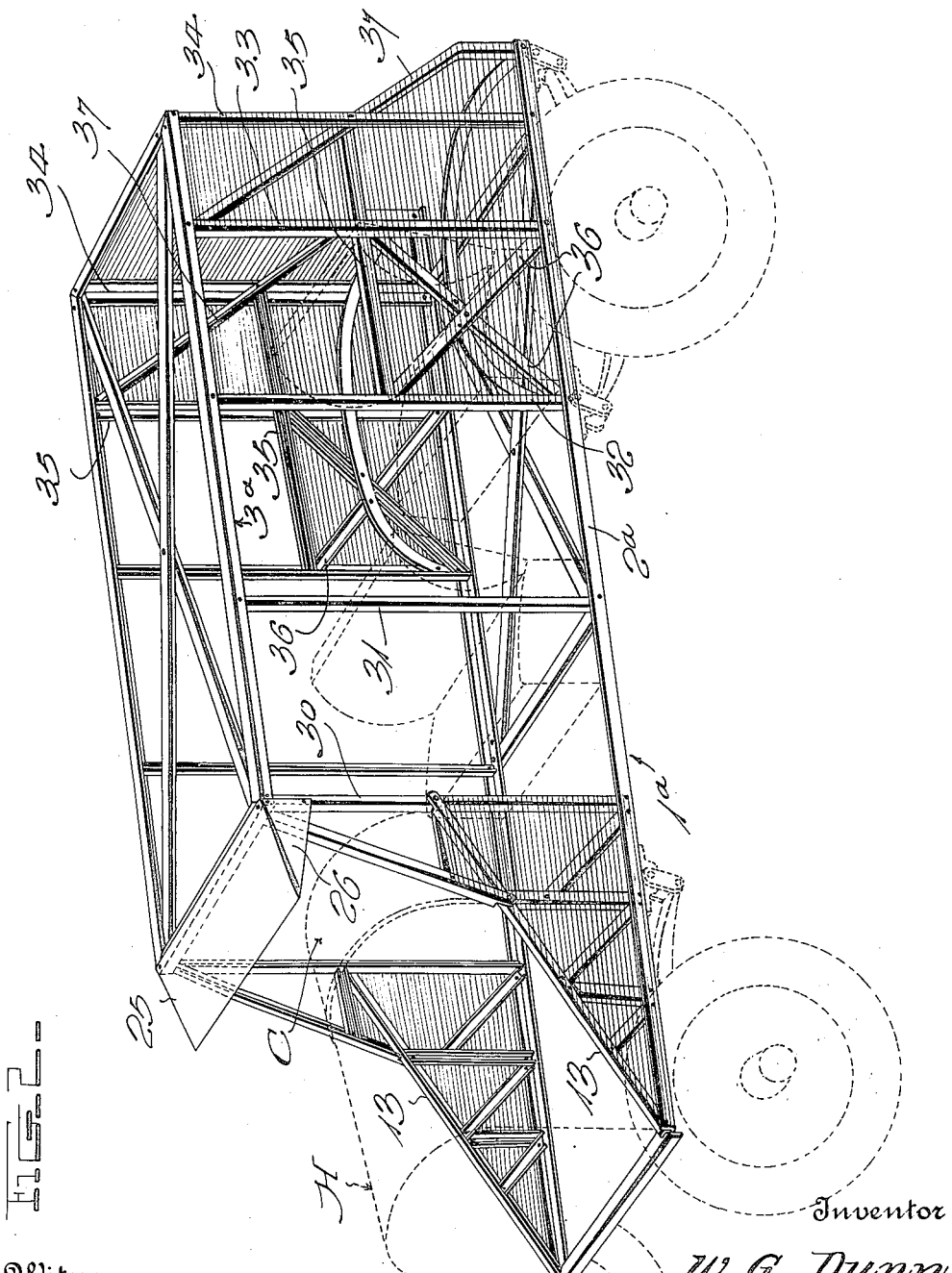

Patented Jan. 20, 1925.

1,523,636

UNITED STATES PATENT OFFICE.

WILLIAM G. DUNN, OF CLARINDA, IOWA.

AUTOMOBILE BODY FRAME.

Application filed November 9, 1922. Serial No. 599,828.

*To all whom it may concern:*

Be it known that I, WILLIAM G. DUNN, a citizen of the United States, residing at Clarinda, in the county of Page and State of Iowa, have invented certain new and useful Improvements in Automobile Body Frames; and I do declare the following to be a full, clear, and exact description of the invention, such as will enable others skilled in the art to which it appertains to make and use the same.

My invention relates to improvements in automobile bodies, and more particularly to those of the closed type, to which present automobile designing is gradually veering. The added cost however, necessary to purchase a machine of the closed body type, is a severe drawback to the universal manufacture of this type of body and another objection is the additional weight of the enclosed type of body. Machines of this character not only employ the usual frames of wood or metal for the body structure, but include heavy chassis frame members which add greatly to the weight.

With the above in mind, it is the object of the present invention to provide an extremely simple light weight body frame including two side frames of truss-like form having upper longitudinal bars under compression, lower longitudinal or chord bars under tension, and vertical struts connecting the upper and lower bars, forming a frame structure which is sufficiently rigid to permit the ordinary chassis frame to be entirely dispensed with, said side frames being adapted to be connected with the vehicle springs to take the place of the usual chassis bars.

With the foregoing in view, the invention resides in the novel subject matter hereinafter described and claimed, the description being supplemented by the accompanying drawings.

Figure 1 is a perspective view of a coupe body frame constructed in accordance with my invention.

Figure 2 is a perspective view of a sedan frame of my improved form.

In describing my invention, I will first refer to the construction of a coupe body as illustrated in Fig. 1. The frame for a body of this type includes a pair of truss-like frames 1 and as they are of identical construction, only one will be described. This frame is provided with a lower longitudinal or chord bar 2 which is under tension and may be connected directly to the springs at one side of an automobile chassis, permitting the usual chassis frame to be eliminated. Above the bar 2 and of a length equal to the length of the coupe top, is an upper or compression bar 3, said bars 2 and 3 being connected by vertical struts 4, 5, and 6, the struts 4 and 6 being disposed respectively at the rear and front of the passenger-carrying compartment of the frame, while the strut 5 is positioned at the rear edge of an opening for a suitable door. An inclined brace bar 7 extends from the angle between the strut 5 and the bar 2, to the angle between the strut 4 and the bar 3 and is rigidly secured in place, while a horizontal bar 8 is secured at its ends to the struts 4 and 5 and at its centre to the brace bar 7. The space between the bars 3 and 8 and the strut 5 and brace 7, forms a window opening.

A supplemental chord bar 9 extends rearwardly from the strut 4 and is secured to this strut between its ends, while its front end is secured to the strut 5. The front portions of these supplemental chord bars 9 may well support the seat frame of the machine, while the rear ends of said bars 9 may be connected to the rear springs in any desired manner. A rearwardly declined compression bar 10 is secured to the rear strut 4 and may either be a separate piece from the bar 8 or formed by extending this bar rearwardly. The rear ends of the bars 9 and 10 are connected by a vertical strut 11 and the rearwardly inclined brace 12 connects the upper end of the strut 11 with the lower end portion of the strut 4.

Forwardly declined compression bars 13 are secured at their front ends to the front ends of the chord bars 2 while the rear ends of said bars 13 are secured to the front struts 6, between the ends of the latter. Supplemental struts 14 extend between and are secured to the bars 2 and 13 and I prefer that certain of these supplemental struts shall extend above the forwardly declined bar 13 as indicated at 15, this upwardly extending portion being connected by a short horizontal bar 16 with the front strut 6. A rather steeply inclined compression bar 17 is secured at its lower portion to the bars 13 and 16 and has its upper end suitably secured to the front strut 6.

The two side frames 1 are adequately connected by cross members. For instance,

I have shown several cross bars 18 extending between and secured to the lower portions of said frames and it will be understood that the motor supports also will be secured to the chord bars 2, serving to additionally stiffen and reinforce the general frame structure. The aforesaid bars 2 are preferably of angle iron form in order that the floor boards may rest upon their flanges and I prefer to connect the floor-supporting portions of said bars by a pair of crossed brace bars 19 which serve as additional floor supports.

In addition to the cross members above mentioned, I have shown a tie bar 20 connecting the intermediate portions of the two struts 6, another tie bar 21 secured at its ends to the rear ends of the bars 10, cross bars 22 secured at their ends to the ends of the compression bars 3, crossed brace bars 23 also connecting the ends of the bars 3, and similar crossed bars 24 secured at their ends to the rearwardly projecting portions of the supplemental chord bars 9.

A visor 25 is preferably provided, said visor having end cheeks 26 extending across and secured to the upper ends of the struts 6 and compression bars 17, whereby to form additional braces.

The portions of the frame structure which are covered by sheet metal or any other suitable covering have been indicated in the drawings by the shade lines and it will be seen that this covering terminates along the forwardly declined compression bars 13, to which the motor hood H may be connected in any desired manner. This hood and the cowl C which extends between the bars 16, have been shown in dotted lines and while it will be understood that the roof may be of any desired construction, it has been omitted for the sake of clearness. The same applies to the floor boards and seat frame, although I have indicated a seat by the letter S.

If desired, in addition to the several connecting members between the two side frames 1, above described, crossed brace bars 27 disposed in a vertical plane may be provided wherever necessary. I have shown these bars extending between the struts 14 and the upwardly extended ends 15, whereby to transversely brace the frame. The ordinary dashboard, instrument board and transverse metal panels, for instance below the front of the seat and at the back of the seat, also serve for this purpose.

Parts of the sedan body disclosed in Fig. 2 are substantially identical with corresponding parts of the coupe body above described, and hence their details will not be again entered into. The sedan body frame consists of two identical side frames 1ª connected by appropriate transverse members which are shown but not described in detail, as their functions and locations are obvious. Each frame 1ª includes a lower or chord bar 2ª which extends throughout the length of the frame. Above this bar is an upper or compression bar 3ª which is connected with the chord bar 2ª by five vertical struts 30, 31, 32, 33 and 34. The spaces between the strut 31 and the struts 30 and 32 constitute door openings, while the space between the upper portions of the struts 32 and 33 forms a window opening. At the lower edge of this opening is a horizontal bar 35 connecting the struts 32 and 33 and crossed brace bars 36 may well be provided below said bar 35. The rear strut 34 is preferably spaced forwardly from the rear end of the chord bar 2ª and an inclined compression bar 37 rises from the rear end of said chord bar to the upper end of the strut 33.

In both forms of my invention, and in any other types in which it may be incorporated, attention is directed to the fact that the side frames are of truss-like form including a lower chord bar, an upper compression bar, and braced struts connecting said upper and lower bars. An extremely rigid construction is thus provided, regardless of the fact that it is comparatively light. Thus, the side frames are sufficiently strong to take the place of the usual side bars of an ordinary chassis frame and it will thus be seen that a portion of the body frame provides all that is necessary for supporting the motor, transmission, floor, etc.

Wood or metal bars of any desired cross section may be used in the construction of the frames but I prefer to employ angle iron or steel in some instances and channel iron or steel in others, but such details as these may readily be left to the skill of the manufacturer, as it will be understood that the present disclosure is for illustrative purposes only and that within the scope of the invention as claimed, numerous changes may be made. Furthermore, it is well within the scope of the invention to construct buss bodies with a plurality of windows, or doors and windows in their sides, and while I have shown the chord bars connected directly to the vehicle springs, it will be understood that the springs may be connected with any desired parts of the side frames or with brackets, cross members or the like extending therefrom.

I claim:

1. A complete substitute for the usual power-plant-a n d-b o d y-supporting-chassis-frame and the usual body-skeleton of a sedan, coupe or other closed type of automobile, comprising a pair of connected truss-like side frames of a length and height to extend throughout the length and height of the completed automobile, said side frames being adapted to entirely take the place of the usual chassis-frame-side-bars and being adapted for direct connection at their front and rear ends to the spring suspension of the machine; each of said side frames including a lower or chord bar under longitudinal tension, an upper top-supporting bar under longitudinal compression and having its front end spaced rearwardly from the front end of said lower bar, vertical struts secured to said upper and lower bars in spaced relation to provide for a door opening or a door and a window opening between but not through said upper and lower bars, one of said struts being located at the front end of said top-supporting bar for disposition at a front corner of the passenger compartment of the body, a forwardly declined compression bar for disposition at one side of the automobile motor, said declined bar being secured at its rear end to the intermediate portion of said one strut and secured at its front end to said lower or chord bar, and auxiliary struts extending from said forwardly declined compression bar to said lower or chord bar.

2. A complete substitute for the usual power-plant-and-body-supporting-chassis-frame and the usual body-skeleton of a sedan, coupe or other closed type of automobile, comprising a pair of connected truss-like side frames of a length and height to extend throughout the length and height of the completed automobile, said side frames being adapted to entirely take the place of the usual chassis-frame-side-bars and being adapted for direct connection at their front and rear ends to the spring suspension of the machine; each of said side frames including a lower or chord bar under longitudinal tension, an upper top-supporting bar under longitudinal compression and having its front end spaced rearwardly from the front end of said lower bar, vertical struts secured to said upper and lower bars in spaced relation to provide for a door opening or a door and a window opening between but not through said upper and lower bars, one of said struts being located at the front end of said top-supporting bar for disposition at a front corner of the passenger compartment of the body, a forwardly declined compression bar for disposition at one side of the automobile motor, said declined bar being secured at its rear end to the intermediate portion of said one strut and secured at its front end to said lower or chord bar, auxiliary struts extending from said forwardly declined compression bar to said lower or chord bar, and an additional steeply inclined compression bar rising from the intermediate portion of said forwardly declined compression bar to the upper end of said one strut.

3. A complete substitute for the usual power-plant-and-body-supporting-chassis-frame and the usual body-skeleton of a sedan, coupe or other closed type of automobile, comprising a pair of connected truss-like side frames of a length and height to extend throughout the length and height of the completed automobile, said side frames being adapted to entirely take the place of the usual chassis-frame-side-bars and being adapted for direct connection at their front and rear ends to the spring suspension of the machine; each of said side frames including a lower or chord bar under longitudinal tension, an upper top-supporting bar under longitudinal compression, vertical struts secured to said upper and lower bars in spaced relation to provide for a door opening or a door and a window opening between said upper and lower bars, and supplemental chord bars secured to certain of said struts in upwardly spaced relation with the rear ends of the first named chord bars and forming seat supports.

In testimony whereof I have hereunto affixed my signature.

WILLIAM G. DUNN.